United States Patent

[11] 3,580,684

[72] Inventor Ernest S. Gordon
    12176 Terrence, Saratoga, Calif. 95070
[21] Appl. No. 631,061
[22] Filed Apr. 14, 1967
[45] Patented May 25, 1971

[54] OPTICAL DENSITY-CALIBRATED PHOTOMETER
    8 Claims, 1 Drawing Fig.
[52] U.S. Cl. .................................................... 356/226,
    250/207, 250/218
[51] Int. Cl. ..................................................... G01j 1/44
[50] Field of Search .......................................... 356/96,
    201, 226, 227; 250/207, 218; 178/5.2

[56] References Cited
    UNITED STATES PATENTS
    2,900,510  8/1959  Sparks, Jr. .................... 250/43.5
    3,097,563  7/1963  Weisglass ..................... 250/207X
    OTHER REFERENCES
    Rider et al. "Encyclopedia on Cathode Ray Oscilloscopes and their Uses," 2d ed. J. F. Rider Pub. Co. New York (1959) pp. 5— 19, 5— 20, 6— 15 thru 6— 18, 19— 63 and 19— 64.
    Brown, " A Rapid Scanning Microdensitometer," J. SMPTE, Vol. 63, Oct. 1954, pp. 147— 50

Ruiter, " Quantitative Measurements" In " Modern Oscilloscopes and Their Uses," Constable and London (London) 1957, pp 311 – 323 & Title Page and Fly Leaf.
ZAK et al., " Automation for Copper, Iron and Zinc in Mixtures," Microchem J., Vol. VI, 1962, pp 67 – 71.
TEKTRONIX TYPE 532 CRO INSTRUCTION MANUAL (1960) pp. 3– 1, 6– 1 thru 6– 3, 2 " Summary of Features" pages.
TEKTRONIX INSTRUCTION MANUAL FOR " Dual-Trace Calibrated Preamp Type 53/54 C," pp. 1— 5 (Examiner's Designation) June 1958

Primary Examiner—Ronald L. Wibert
Assistant Examiner—R. J. Webster
Attorneys—Robert J. Steinmeyer and Paul R. Harder

ABSTRACT: A system in which changes in the optical density of a sample are measured by passing a light beam through the sample including a photomultiplier for intercepting the exit beam and providing an electrical signal corresponding to its intensity. An adjustable high voltage source is used to adjust the output voltage of the photomultiplier circuit to a predetermined reference level. An amplifier network and voltage divider having stepped positions calibrated to directly indicate changes in optical density per volt of output couples the voltage to a fixed gain (volt/cm) oscilloscope or recorder so that change in optical density is directly related to the displacement of the oscilloscope or recorder trace.

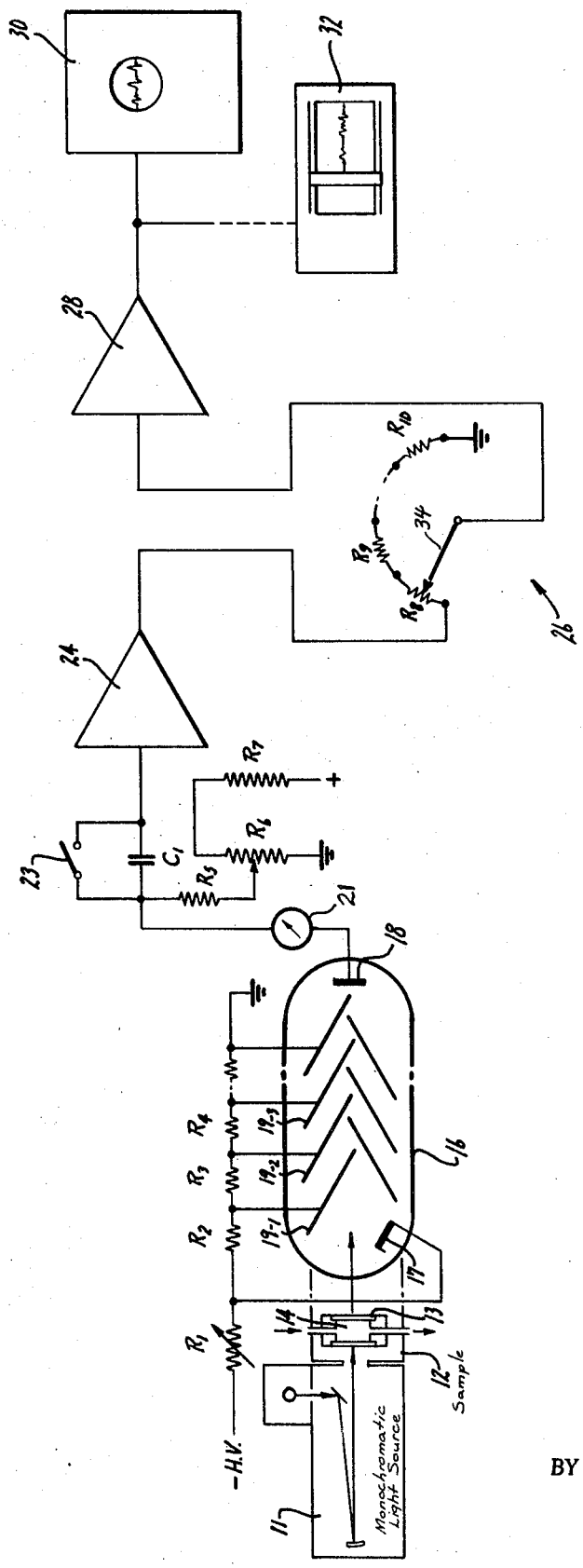

3,580,684

OPTICAL DENSITY-CALIBRATED PHOTOMETER

BACKGROUND OF THE INVENTION

This invention relates to photometers and particularly to spectrophotometers used in the investigation of the kinetics of chemical reactions. Heretofore, measurements of changes in the optical density of samples of materials have been investigated by photometric techniques and have required absolute conversion from photomultiplier output units into optical density units to compute the difference. This leads to time-consuming, cumbersome, and repeated calibrations of equipment and calculations of experimental results. There is, therefore, a need for a new and improved photometer.

SUMMARY OF THE INVENTION

It is an object of the present invention to provide a photometer which will overcome the above-named limitations and disadvantages by having an output directly calibrated in units of optical density change per volt of output.

Another object of the invention is to provide a photometer of the above character which is particularly adapted for studying the kinetics of chemical reactions.

Another object of the invention is to provide a photometer of the above character which is simple to set up and calibrate and which provides a range of easily changed calibrated sensitivities.

Another object of the invention is to provide a photometer of the above character which eliminates the need for manual calculations to obtain optical density change measurements.

In accordance with the above objects there is provided a photometric system for measuring changes in the optical density of a sample through which a light beam is passed. Such a photometric system includes a photoelectric transducer adapted to intercept the light beam passed by the sample and to provide an electrical signal having an amplitude corresponding to the intensity of the light beam. The electrical signal is displayed on suitable display means so that its value can be followed in detail. The invention proposes that the display means be provided with a predetermined gain in centimeters of deflection per volt of input. There is provided a calibration network which includes means for adjusting the output of the photoelectric transducer to a predetermined reference level and means responsive to changes in the output of the transducer for supplying a voltage proportional to the change. The latter includes an attenuation means for controlling the value of the voltage in accordance with the magnitude of the voltage change and for supplying that output to the display means. The attenuation means is calibrated to directly indicate change in optical density per volt of output.

These and other objects and features of the invention will become apparent from the following description when taken in conjunction with the accompanying drawings.

DETAILED DESCRIPTION OF THE DRAWING AND PREFERRED EMBODIMENT

The drawing schematically shows the electrical circuit for carrying out the invention together with a diagrammatic illustration of the pertinent portions of a photometer in which it is incorporated.

Referring to the drawing, there is shown a photometric system for measuring changes in the optical density of a sample including a light source 11 which may be monochromatic having an adjustable frequency output as in the conventional spectrophotometer. The output of the light source 11 is passed through a sample cell holder 12 containing a sample cell 13 having transparent end windows for permitting the light energy to pass through the cell. The cell 13 serves to contain a sample 14 of the material being analyzed. For reaction kinetics studies the sample of material is typically rapidly injected at a predetermined time and the changes in the transmission of the light beam through the sample are observed to determine the nature of the reaction kinetics taking place. Another common technique disturbs the chemical equilibrium of the sample by joule heating so as to effect its light transmission characteristics. The output of light beam from the sample is intercepted by a photoelectric transducer 16 which may be a photomultiplier tube of conventional type having a cathode 17, anode 18 and dynodes 19-1,41784914 217914 3.2—952 19-2, 19-3. Transducer 16 provides an electrical output signal on anode 18 which has an amplitude corresponding to the intensity of the light beam impinging on the transducer.

Means are provided for adjusting the output of the transducer to a predetermined reference level. For the photomultiplier tube illustrated in the drawing, such means includes a voltage divider network consisting of resistors R1, R2, R3 and R4, the nodes between portions thereof being connected to the dynodes 19-1, 19-2, 19-3 of the photomultiplier tube as shown. The resistance of resistor R1 is made adjustable so that the output of the photomultiplier can be increased or decreased.

The output of the photomultiplier is connected through an ammeter 21 to a load resistance consisting of resistor R5 connected in series with the adjustable input of a balancing potentiometer R6, one end of which is connected to common potential and the other end of which is connected to a positive bias voltage through a resistor R7. The resistor R5 and that portion of R6 connected between the adjustable arm and the common potential form a voltage divider, the resistance of R6 being a minor portion of the total load resistance presented by the voltage divider. The voltage appearing on the input or microammeter side of resistance R5 is coupled to a wide band DC pulse preamplifier through a coupling capacitor C1. A bypass switch 23 is connected in parallel with coupling capacitor C1 and cooperates with R6 to provide a DC-coupled operation as hereinafter explained.

Means are provided which are responsive to changes in the output voltage of the photoelectric transducer appearing across resistor R5 and potentiometer R6 for supplying a voltage proportional to changes in the output. Such means includes a DC pulse preamplifier 24 connected in series with an attenuation means 26 and DC buffer amplifier 28 the output of which is supplied to display means such as oscilloscope 30 or chart recorder 32. The display means is set for a predetermined fixed gain in centimeters of deflection per volt of input for providing a visual display of electrical signals applied to thereto in real time.

The attenuation means 26 controls the value of the voltage increment applied to the display means and maintains it within its range. Such means comprises a voltage divider having a plurality of fixed resistances R8, R9 and R10 connected in series and contact means 34 for selectively connecting the output of the divider to one of the nodes between adjacent resistances. The values of resistances R8, R9 and R10 are selected such that each position of the contact corresponds to a precalibrated value which directly indicates changes in optical density per volt of output.

The following discussion provides the justification for the conversion from a voltage change to a calibration in terms of optical density change:

The definition of optical density (or absorbance) is:
$O.D. = \log_{10}(I_0/I)$
where $I_0$ = light energy incident
$I$ = light energy transmitted (through sample)
Let the initial $O.D.$ of the sample, say $O.D._1$, be:
$O.D._1 = \log_{10}(I_0/I_1)$
where $I_1$ = energy passed at time $t_1$ and let
$O.D._2 = \log_{10}(I_0/I_2)$ at time $t_2$.
The incremental $O.D.$, say $\Delta O.D.$, between times $t_1$, $t_2$ $$\Delta O.D. = \log_{10}(I_0/I_1) - \log_{10}(I_0/I_2) = \log_{10}(I_2/I_1) = \log_{10}\left(1 + \frac{I_2 - I_1}{I_1}\right)$$

Say that the increment of change of $O.D.$ is small, so that $(I_2-I_1)/I_1 <<$
It can be shown by way of an expansion series that $\ln(1+a) \cong a$ where $a \ll 1$.
Therefore,
$\Delta O.D. \cong (\log_{10}e)(I_2-I_1)/I_1 = 0.433(I_2-I_1)/I_1$ It can further be shown that for a $\Delta O.D. < 0.03$, the error from the above approximation is small. Since photocurrent is directly proportional, within design limits, to light energy received, and if the phototube load resistance R5, R6 is constant, $\Delta O.D.$ can be expressed in terms of load resistance voltage drop, $v$:

$\Delta O.D. = 0.433(V_2-V_1)/V_1 0.433(\Delta V/V_1)$.

Referring again to the drawing, a predetermined value of $V_1$ is set by adjusting potentiometer R1 to control the photomultiplier dynode voltages so that the voltage drop appearing across load resistance R5 and R6 attains a predetermined reference level as indicated by the deflection of microammeter 21. The amplified output voltage delivered to the oscilloscope is controlled with the calibrated voltage divider 26. Resistance values R8, R9, R10 are chosen so that positions 1, 2, 3, etc., correspond to values of $\Delta O.D.$ per centimeter of oscilloscope deflection ($\Delta O.D./$cm.) such as, for example, 0.001, 0.002, 0.005 $\Delta O.D./$cm. The oscilloscope 30 sensitivity is fixed and remains at a predetermined fixed value. The chart recorder 32, if used, is initially set in sensitivity so that its full scale deflection corresponds to that of the oscilloscope 30 so that the recorder 32 also will read directly in $\Delta O.D.$ per centimeter of deflection.

For recording fast changes in optical density, and slower changes down to the order of 1 second, the switch 23 bypassing coupling capacitor C1 is left open. For changes slower than this, switch 23 is closed to allow direct coupling of the system. In this case the balancing potentiometer R6 is adjusted for zero baseline before each run. The incremental optical density per centimeter calibration is not appreciably effected by this procedure provided that R6 is made sufficiently small with respect to R5, say less than about one-hundreth the value thereof.

Summarizing the general operation, R1 is first adjusted for a present value, for example, a 40 microampere deflection on microammeter 21. If operating DC coupled, R6 is set for zero output from amplifier 24. The calibrated voltage divider 26 is set for the anticipated change of optical density expected from the run. The change in optical density ($\Delta O.D.$) obtained is then simply determined by multiplying the number of centimeters in deflection of the scope (or recorder) by the calibration setting of voltage divider 26 (O.D. per centimeter).

To those skilled in the art to which the invention relates many changes in the procedures and widely differing embodiments and applications of the invention will suggest themselves without departing from its spirit and scope. For example, the calibration technique herein may be employed in any photometer or spectrophotometer system wherein change in optical density is to be measured. Many such systems use simple phototubes or photocells instead of photomultipliers and it will be obvious that optical apertures may be provided to produce the present value of photocell current for the calibration procedure.

I claim:

1. In a system for measuring changes in the optical density of a sample through which a light beam of first intensity is transmitted under first predetermined conditions and through which a light beam of second intensity is transmitted under second predetermined conditions such that the change in optical density is proportional to the ratio of the first and second intensity difference to the first intensity, said system including a photoelectric transducer adapted to intercept said light beam transmitted by the sample and to provide electrical signals having amplitudes corresponding to the first and second intensities of the light beam and display means having a predetermined gain in centimeters of deflection per volt of input for providing a visual display of said electrical signals, a calibration network comprising means for adjusting the magnitude of the output of said photoelectric transducer to a predetermined reference voltage level under the first predetermined conditions, means responsive to changes in the output of said photoelectric transducer under the second predetermined conditions for supplying a voltage change proportional to the change in the output, such that the change in optical density is proportional to the ratio of the voltage change to the reference voltage level, said last named means including an attenuation means for controlling the value of the magnitude of the voltage change according to the magnitude of the changes in the output of said photoelectric transducer, the output of said attenuation means being sensed by said display means, said attenuation means being calibrated to indicate changes in optical density per unit of deflection of the display means.

2. A system as in claim 1 wherein said attenuator means is a voltage divider.

3. Apparatus as in claim 1 wherein said means responsive to the output of the photoelectric transducer includes an ammeter in series with a load resistance, the gain of said photoelectric transducer being adjustable to obtain a predetermined current through said load resistance.

4. Apparatus as in claim 2 wherein said voltage divider comprises a plurality of fixed resistances connected in series and switching means for selectively connecting the output of the attenuator to one of the nodes between adjacent resistances.

5. Apparatus as in claim 2 wherein a wide band pulse amplifier is connected in series in the load resistance and the voltage divider.

6. Apparatus as in claim 5 further including a DC-blocking capacitor connected in series with the input of said amplifier so that said amplifier is sensitive only to changes in the voltage developed across said load resistance.

7. Apparatus as in claim 5 further including a switch connected across said capacitor for selectively bypassing the same and wherein said load resistance includes a voltage divider the resistance of which is a minor portion of the total resistance of said load resistance one side of said potentiometer being connected to a bias potential, the adjustable arm of said potentiometer being connected to the other portion of said load resistance, and the other fixed arm of said potentiometer being connected to reference potential adjustment of said potentiometer serving to offset the reference voltage level to establish a variable reference baseline when said switch is closed.

8. Apparatus as in claim 1 further including a buffer amplifier connected in series between the output of said voltage divider and said display means.